(12) United States Patent
Yeh

(10) Patent No.: US 8,662,747 B2
(45) Date of Patent: Mar. 4, 2014

(54) TEMPERATURE SENSING APPARATUS AND METHOD OF SENSING TEMPERATURE

(75) Inventor: Mei Chao Yeh, Hsinchu (TW)

(73) Assignee: Pixart Imaging Inc., Hsinchu (TW)

( * ) Notice: Subject to any disclaimer, the term of this patent is extended or adjusted under 35 U.S.C. 154(b) by 29 days.

(21) Appl. No.: 13/287,214

(22) Filed: Nov. 2, 2011

(65) Prior Publication Data

US 2012/0140792 A1 Jun. 7, 2012

(30) Foreign Application Priority Data

Dec. 3, 2010 (TW) ................................ 99142043 A

(51) Int. Cl.
*H01L 35/00* (2006.01)
*H03K 3/42* (2006.01)

(52) U.S. Cl.
USPC .......................................... 374/170; 327/512

(58) Field of Classification Search
USPC .................... 374/170, 171; 327/512
See application file for complete search history.

(56) References Cited

U.S. PATENT DOCUMENTS

| | | | | |
|---|---|---|---|---|
| 7,331,708 B2 * | 2/2008 | Blom et al. | .................... | 374/171 |
| 7,532,056 B2 * | 5/2009 | Seo | ................................ | 327/512 |
| 8,262,286 B2 * | 9/2012 | Peterson et al. | ............. | 374/170 |
| 2003/0067344 A1 * | 4/2003 | Nanba et al. | .................. | 327/513 |

* cited by examiner

*Primary Examiner* — Lisa Caputo
*Assistant Examiner* — Brandi N Hopkins
(74) *Attorney, Agent, or Firm* — Stites & Harbison PLLC; Juan Carlos A. Marquez, Esq.

(57) ABSTRACT

A temperature sensing apparatus disposed inside a chip includes first and second current generation circuits, first and second current-to-frequency converters, and a counting unit. The first current generation circuit is configured to generate a first current varying proportional to the temperature of the temperature sensing apparatus. The second current generation circuit is configured to generate a second current independent of temperature. The first current-to-frequency converter is configured to generate a first frequency signal with a first frequency indicative of the first current, and the second current-to-frequency converter is configured to generate a second frequency signal with a second frequency indicative of the second current. The counting unit is configured to generate a digital signal indicative of the temperature according to the difference between the first and second frequencies.

16 Claims, 6 Drawing Sheets

TEMPERATURE SENSING APPARATUS AND METHOD OF SENSING TEMPERATURE

BACKGROUND OF THE INVENTION

1. Field of the Invention

The present invention relates to a temperature sensing apparatus and a method of sensing temperature, and relates more particularly to a temperature sensing apparatus disposed in a chip and a method of sensing temperature.

2. Description of the Related Art

The performance of integrated circuits is usually affected by the temperature of their internal components. Thus, many temperature-sensing circuits are extensively used in integrated circuits to measure the internal temperatures of the integrated circuits. FIG. 1 is a block diagram illustrating a conventional temperature sensing circuit 10. Referring to FIG. 1, the temperature sensing circuit 10 comprises a voltage generation circuit 12 configured to generate a voltage $V_{PTATA}$ that varies with changes in temperature and a voltage-to-frequency converter 14 configured to receive the voltage $V_{PTATA}$ to generate a frequency signal $f_{PTAT}$. Because the voltage $V_{PTATA}$ varies linearly with the variation of temperature, the frequency signal $f_{PTAT}$ changes according to the variation of temperature.

In the conventional circuit, a crystal oscillator (not shown) counts the pulse number of the frequency signal $f_{PTAT}$. The crystal oscillator is an external component that increases cost and needs an installation area. Further, an extra pin is needed on the chip to connect with the crystal oscillator. Thus, electronic industries need a temperature-sensing device that can be disposed in a chip to mitigate the above issues.

SUMMARY OF THE INVENTION

The present invention discloses a temperature sensing apparatus that can be disposed in a chip.

According to one embodiment of the present invention, the temperature sensing apparatus comprises a first current generation circuit, a second current generation circuit, a first current-to-frequency converter, a second current-to-frequency converter, and a counting unit. The first current generation circuit is configured to generate a first current related to a temperature surrounding the first current generation circuit. The second current generation circuit is configured to generate a second current independent of temperature. The first current-to-frequency converter is configured to receive the first current to generate a first frequency signal with a first frequency indicative of the first current. The second current-to-frequency converter is configured to receive the second current to generate a second frequency signal with a second frequency indicative of the second current. The counting unit is configured to generate a digital signal indicative of the temperature according to the difference between the first and second frequencies.

Another embodiment of the present invention discloses a method of sensing temperature. The method comprises generating a first current related to a temperature, generating a second current independent of the temperature, converting the first current to generate a first frequency signal with a first frequency indicative of the first current, converting the second current to generate a second frequency signal with a second frequency indicative of the second current, and generating a digital signal indicative of the temperature by comparing the first and second frequencies.

To better understand the above-described objectives, characteristics and advantages of the present invention, embodiments, with reference to the drawings, are provided for detailed explanations.

BRIEF DESCRIPTION OF THE DRAWINGS

The invention will be described according to the appended drawings in which.

DETAILED DESCRIPTION OF THE INVENTION

One aspect of the present invention herein exemplarily demonstrates a temperature sensing apparatus and a method of sensing temperature. In order to facilitate a thorough understanding of the present invention, detailed descriptions of method steps and components are provided below. Clearly, the implementations of the present invention are not limited to the specific details that are familiar to persons skilled in the art of optoelectronic semiconductor manufacturing processes. On the other hand, components or method steps that are well known are not described in detail. A preferred embodiment of the present invention will be described in detail. However, in addition to the preferred detailed description, other embodiments can be broadly employed, and the scope of the present invention is not limited by any of the embodiments, but should be defined in accordance with the following claims and their equivalents.

Figure 1:
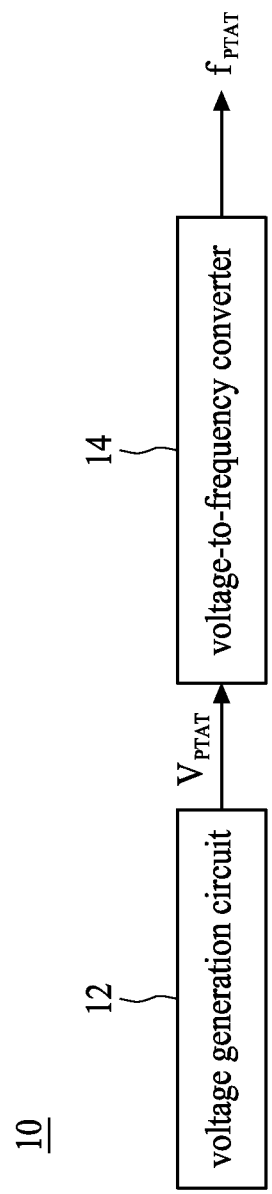
FIG. 1 is a block diagram illustrating a conventional temperature sensing circuit.
Figure 2:
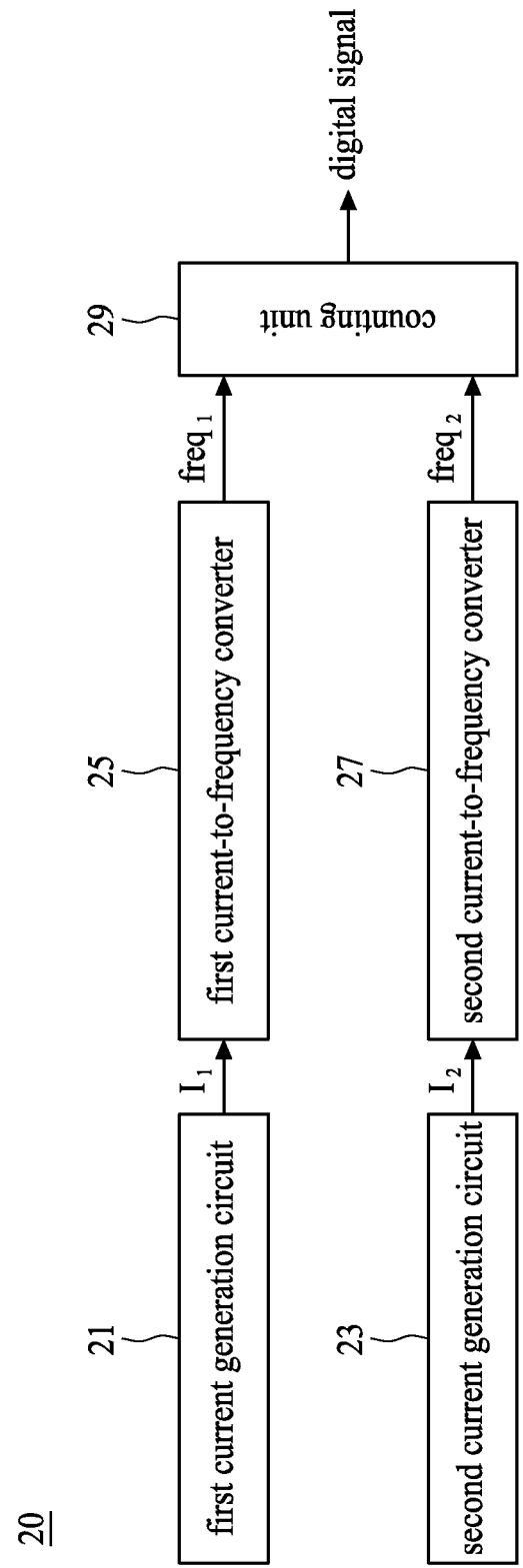
FIG. 2 is a block diagram illustrating a temperature sensing apparatus according to one embodiment of the present invention.

FIG. 2 is a block diagram illustrating a temperature sensing apparatus 20 according to one embodiment of the present invention. The temperature sensing apparatus 20 can be disposed in a chip and is configured to sense the internal temperature of the chip and output a digital signal indicative of the temperature. Referring to FIG. 2, the temperature sensing apparatus 20 may comprise a first current generation circuit 21, a second current generation circuit 23, a first current-to-frequency converter 25, a second current-to-frequency converter 27, and a counting unit 29.

The first current generation circuit 21 is configured to generate a first current $I_1$ according to the temperature of the interior of the chip. The second current generation circuit 23 is configured to generate the second current $I_2$ independent of temperature. The first current-to-frequency converter 25 may connect to the first current generation circuit 21 and is configured to receive the first current $I_1$ to generate a first frequency signal $freq_1$, wherein the first frequency signal $freq_1$ varies in response to the first current $I_1$. The second current-to-frequency converter 27 may connect to the second current generation circuit 23 and is configured to receive the second current $I_2$ to generate a second frequency signal $freq_2$, wherein the second frequency signal $freq_2$ varies in response to the second current $I_2$. The counting unit 29 is configured to generate a digital signal according to the difference between the first frequency signal $freq_1$ and the second frequency signal $freq_2$, wherein the digital signal may be an N-bit code word indicative of the temperature of the interior of the chip.

Figure 3:
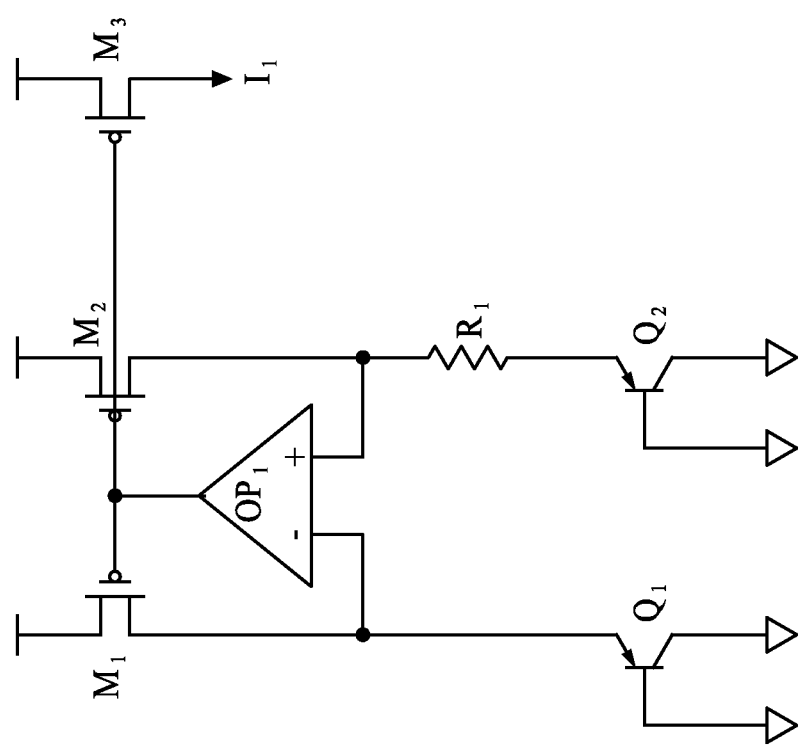
FIG. 3 is a circuit diagram of the first current generation circuit according to one embodiment of the present invention.

FIG. 3 is a circuit diagram of the first current generation circuit 21 according to one embodiment of the present invention. Referring to FIG. 3, two bipolar junction transistors $Q_1$ and $Q_2$ may operate under the same current to generate the first current $I_1$. The transistor $Q_1$ may be a unit transistor, and the transistors $Q_2$ may comprise N unit transistors connected in parallel. The voltage differences (voltage $\Delta V_{be}$) between the bases and the emitters of the two bipolar junction transistors $Q_1$ and $Q_2$ vary proportional to an absolute temperature. Thus, a transistor $M_2$ can generate a current by applying the voltage $\Delta V_{be}$, to a resistor $R_1$. The current $I_1$ of a transistor $M_3$ is a copy of the current of the transistor $M_2$. The circuit shown in FIG. 3 serves as a symbolic model; FIG. 3 does not actually show the real structure of the first current generation circuit 21. In the present embodiment, the current $I_1$ varies proportional to an absolute temperature. Alternatively, in another embodiment of the present invention, the current $I_1$ is complementary to an absolute temperature. Specifically, the current $I_1$ decreases linearly in response to the increase of an absolute temperature.

Figure 4:
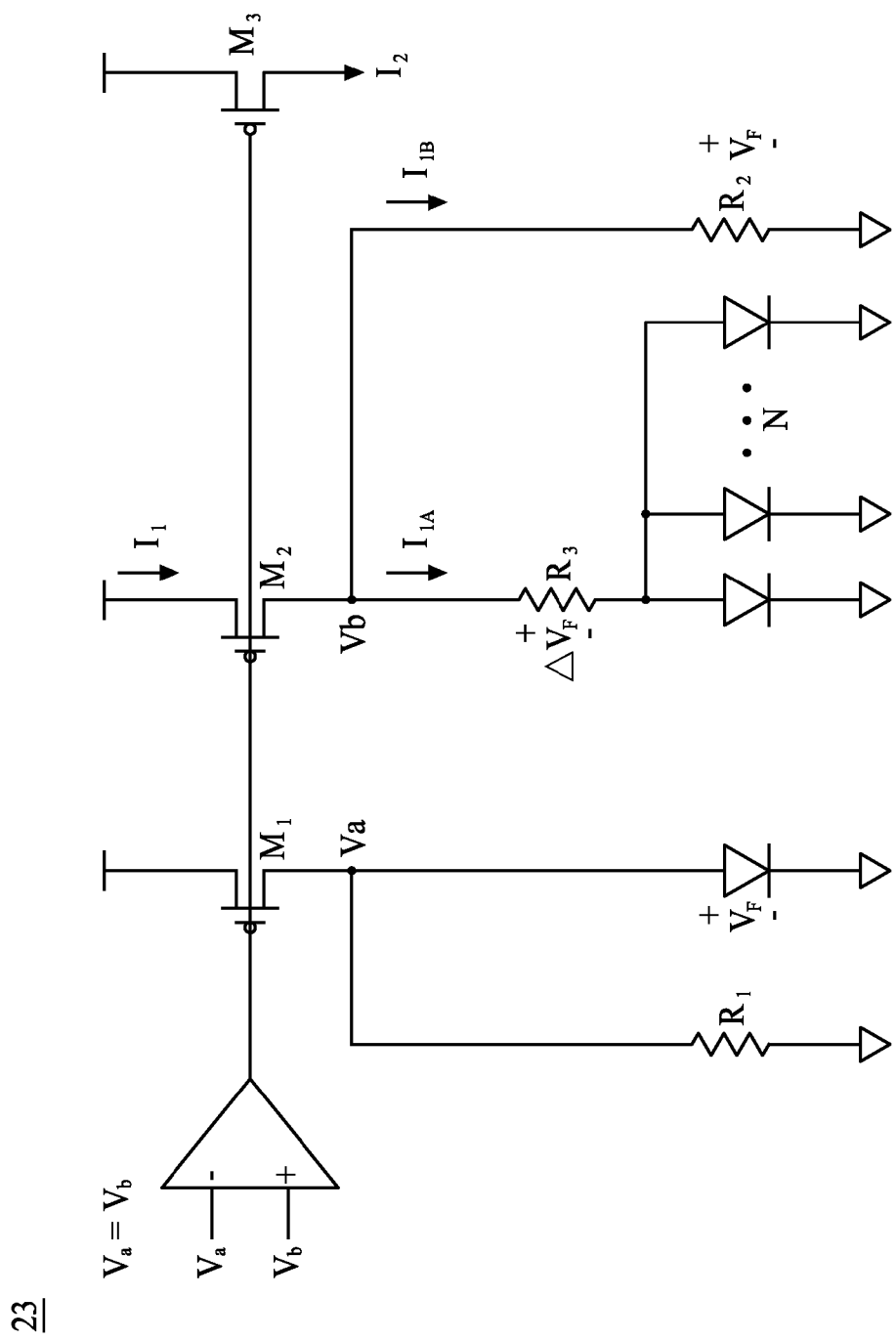
FIG. 4 is a circuit diagram of the second current generation circuit according to one embodiment of the present invention.

FIG. 4 a circuit diagram of the second current generation circuit 23 according to one embodiment of the present invention. Referring to FIG. 4, the second current generation circuit 23 generates a current $I_1$ independent of temperature by summing a current $I_{1A}$ proportional to an absolute temperature and a current $I_{1B}$ complementary to the absolute temperature, and generates a current $I_2$ by copying the current $I_1$. In the present embodiment, the current $I_{1A}$ may be generated by applying a voltage $\Delta V_F$ to a resistor $R_3$, and the current $I_{1B}$ may be generated by applying a voltage $V_F$ to a resistor $R_2$. The circuit shown in FIG. 4 serves as a symbolic model; FIG. 4 does not actually show the real structure of the second current generation circuit 23.

Referring to FIG. 2, the first and second currents $I_1$ and $I_2$ are respectively transmitted to the first and second current-to-frequency converters 25 and 27. In one embodiment of the present invention, the first and second current-to-frequency converters 25 and 27 may have the same configuration, thereby eliminating or minimizing the effects of non-idealities on the operation of the converters 25 and 27. For example, when the first current-to-frequency converter 25 changes an output frequency value due to the increase of temperature, the output frequency value of the second current-to-frequency converter 27 may change by the same degree as well because the two converters 25 and 27 have the same configuration.

Figure 5:
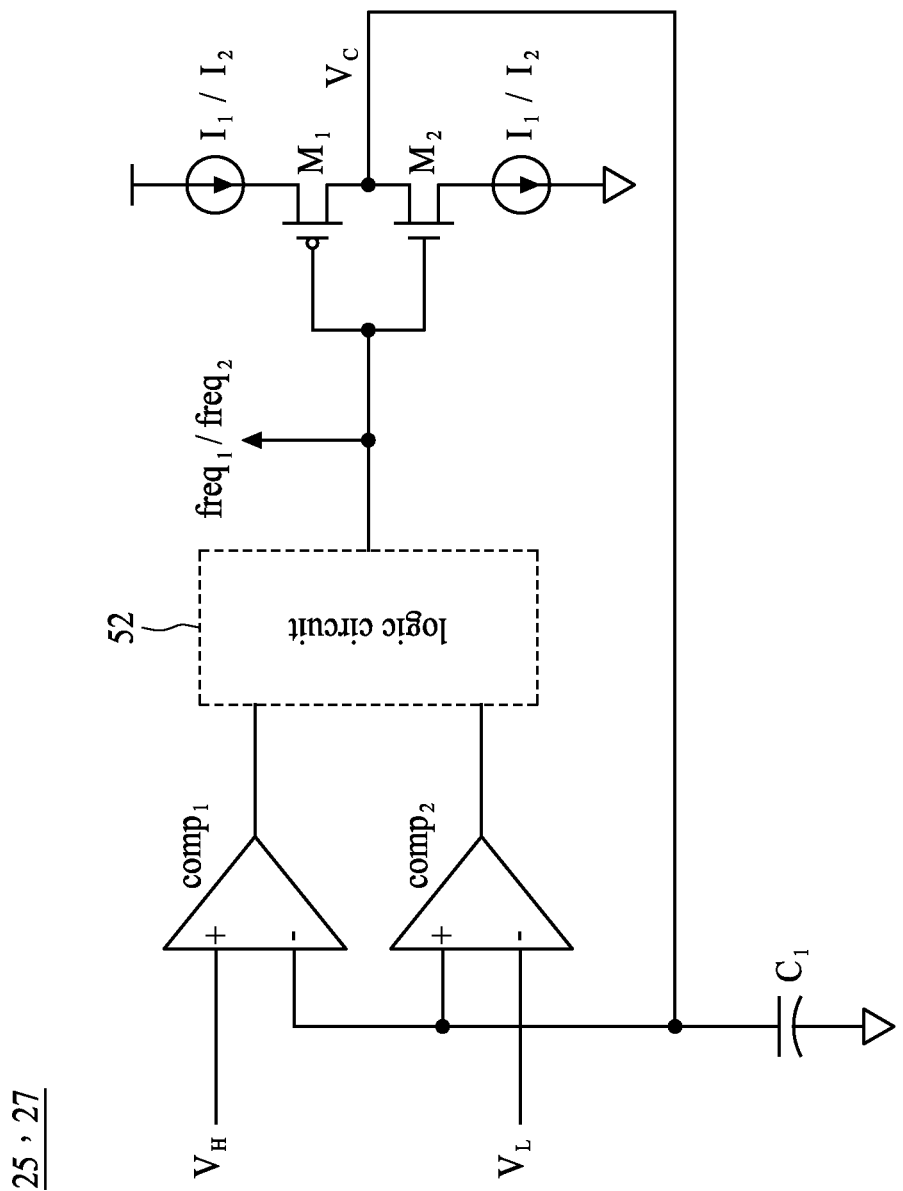
FIG. 5 is a circuit diagram of the first and second current-to-frequency converters according to one embodiment of the present invention.

FIG. 5 is a circuit diagram of the first and second current-to-frequency converters 25 and 27 according to one embodiment of the present invention. Referring to FIG. 5, each of the first and second current-to-frequency converters 25 and 27 may comprise a capacitor $C_1$, a first comparator $COMP_1$, a second comparator $COMP_2$, and a logic circuit 52. The capacitor $C_1$ is configured to receive the corresponding one of the first and second currents $I_1$ and $I_2$ to generate a charge/discharge voltage $V_C$. During operation, when the voltage $V_C$ is greater than a predetermined voltage $V_H$ of the first comparator $COMP_1$, the transition of the output signal of the logic circuit 52 occurs so as to turn on the transistor $M_2$; consequently, the capacitor $C_1$ can discharge. When the voltage $V_C$ is smaller than a predetermined voltage $V_L$ of the second comparator $COMP_2$, the transition of the output signal of the logic circuit 52 occurs again so as to turn on the transistor $M_1$. As a result, the capacitor $C_1$ can be charged. With the process of repetitively charging and discharging the capacitor $C_1$ and the comparison results from the comparators $COMP_1$ and $COMP_2$, the logic circuit 52 can output the corresponding one of the first frequency signal $freq_1$ and the second frequency signal $freq_2$ according to the corresponding one of the first and second currents $I_1$ and $I_2$.

Figure 6:
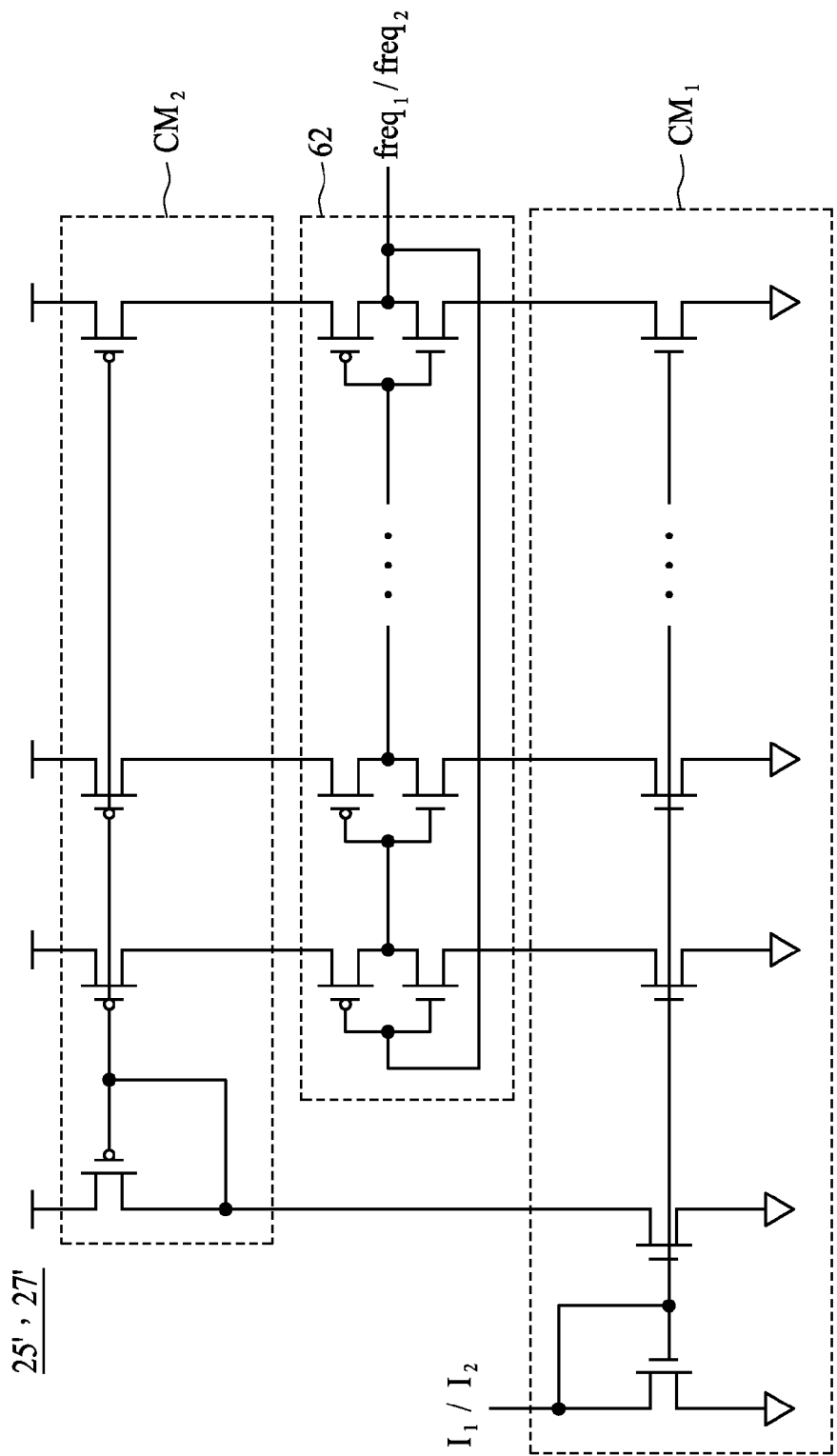
FIG. 6 is a circuit diagram of the first and second current-to-frequency converters according to another embodiment of the present invention.

FIG. 6 is a circuit diagram of the first and second current-to-frequency converters 25' and 27' according to another embodiment of the present invention. Referring to FIG. 6, each of the first and second current-to-frequency converters 25' and 27' may comprise a first current mirror circuit $CM_1$ configured to receive the first or second currents $I_1$ or $I_2$ and duplicate first and second currents $I_1$ and $I_2$ to generate a plurality of sink currents, a second current mirror circuit $CM_2$ partially coupled to the first current mirror circuit $CM_1$ to generate a plurality of source currents by duplicating the first or second currents $I_1$ or $I_2$, and a ring oscillator 62 comprising a plurality of inverters. The ring oscillator 62 may couple with the first current mirror circuit $CM_1$ and the second current mirror circuit $CM_2$ for generating the first frequency signal $freq_1$ or the second frequency signal $freq_2$. In addition to the above embodiments, the first and second current-to-frequency converters 25 and 27 may be first and second current-to-frequency converters 25 and 27 with any configuration.

Referring to FIG. 2, the counting unit 29 can generate a digital signal indicative of the internal temperature of a chip according to the difference between the first frequency signal $freq_1$ and the second frequency signal $freq_2$. In one embodiment of the present invention, the second frequency signal $freq_2$ may be over 10 times the first frequency signal $freq_1$. Thus, the pulse width of the first frequency signal $freq_1$ can be obtained by counting the pulse number of the second frequency signal $freq_2$. The counting unit 29 may be designed as a synchronous or non-synchronous counter. In another embodiment of the present invention, the counting unit 29 may comprise a predetermined database, which may comprise data representing the relationship between temperature and frequency. The counting unit 29 may, according to the difference between the first frequency signal $freq_1$ and the second frequency signal $freq_2$, look up the database to generate the digital signal representing the temperature of the chip.

Employing the temperature sensing apparatus embodied according to the present invention, a first current related to a temperature and a second current independent of the temperature are initially generated. Next, the first current is converted to generate a first frequency signal. The second current is converted to generate a second frequency signal. The first frequency signal represents the first current; thus, the frequency of the first frequency signal is in response to the variation of environmental temperature. Finally, the second frequency signal, which is substantially independent of temperature, is used to count the pulse number of the first frequency signal so as to obtain a digital signal. The digital signal can be an N-bit code word indicative of the temperature sensed by the temperature sensing apparatus.

The above-described embodiments of the present invention are intended to be illustrative only. Numerous alternative embodiments may be devised by persons skilled in the art without departing from the scope of the following to claims.

What is claimed is:
1. A temperature sensing apparatus, comprising:
 a first current generation circuit configured to generate a first current related to a temperature surrounding the first current generation circuit;
 a second current generation circuit configured to generate a second current independent of temperature;

a first current-to-frequency converter configured to receive the first current to generate a first frequency signal with a first frequency indicative of the first current;

a second current-to-frequency converter configured to receive the second current to generate a second frequency signal with a second frequency indicative of the second current; and a counting unit configured to use the second frequency signal to count a pulse number of the first frequency signal in order to generate a digital signal indicative of the temperature according to a difference between the first and second frequencies, wherein the second frequency is greater than 10 times the first frequency.

2. The temperature sensing apparatus of claim 1, wherein the first current varies proportional to an absolute temperature.

3. The temperature sensing apparatus of claim 1, wherein the first current is complementary to an absolute temperature.

4. The temperature sensing apparatus of claim 1, wherein the second current generation circuit comprises a first sub-current current generation circuit configured to generate a first sub-current proportional to an absolute temperature and a second sub-current current generation circuit configured to generate a second sub-current complementary to the absolute temperature, wherein the second current generation circuit generates the second current according to a weighted result of the first sub-current and the second sub-current.

5. The temperature sensing apparatus of claim 1, wherein the first and second current-to-frequency converters have the same configuration.

6. The temperature sensing apparatus of claim 5, wherein each of the first and second current-to-frequency converters comprises:

a capacitor configured to receive a corresponding one of the first and second currents to generate a charge/discharge voltage;

a first comparator configured to compare the charge/discharge voltage with a first predetermined voltage to generate a first signal;

a second comparator configured to compare the charge/discharge voltage with a second predetermined voltage to generate a second signal; and a logic circuit configured to receive the first and second signals to generate respectively the first and second frequency signals with respect to the corresponding one of the first and second currents, wherein the first and second frequencies are different.

7. The temperature sensing apparatus of claim 1, wherein the second frequency is synchronized with the first frequency.

8. The temperature sensing apparatus of claim 1, wherein the counting unit is configured to refer to a predetermined database containing data representing the relationship between temperature and frequency according to the difference between the first and second frequencies to generate the digital signal indicative of the temperature.

9. The temperature sensing apparatus of claim 1, wherein the counting unit is a synchronous or non-synchronous counter.

10. A method of sensing temperature, comprising the steps of:

generating a first current related to a temperature;

generating a second current independent of the temperature;

converting the first current to generate a first frequency signal with a first frequency indicative of the first current;

converting the second current to generate a second frequency signal with a second frequency indicative of the second current; and using the second frequency signal to count a pulse number of the first frequency signal to generate a digital signal indicative of the temperature, wherein the second frequency is greater than 10 times the first frequency.

11. The method of claim 10, wherein the first current varies proportional to an absolute temperature.

12. The method of claim 10, wherein the first current is complementary to an absolute temperature.

13. The method of claim 10, wherein the step of generating a second current independent of the temperature further comprises:

generating a first sub-current proportional to an absolute temperature;

generating a second sub-current complementary to the absolute temperature; and generating the second current according to a weighted result of the first sub-current and the second sub-current.

14. The method of claim 10, wherein the second frequency is synchronized with the first frequency.

15. The method of claim 10, wherein the step of generating a digital signal indicative of the temperature comprises a step of referring to a predetermined database containing data representing the relationship between temperature and frequency according to the difference between the first and second frequencies to generate the digital signal indicative of the temperature.

16. The method of claim 10, wherein the step of generating a digital signal indicative of the temperature comprises a step of employing synchronous or non-synchronous counting to compare the first and second frequencies.

* * * * *